April 3, 1973   P. VIENNOT   3,725,187
ARTICLE COMPRISING POLYTETRAFLUORETHYLENE
AND PROCESS FOR MAKING SAME
Filed Jan. 26, 1970   3 Sheets-Sheet 1

Inventor:
Pierre Viennot
BY Baldwin Wight Diller & Brown
Attorneys

Figures 3, 4, 5:
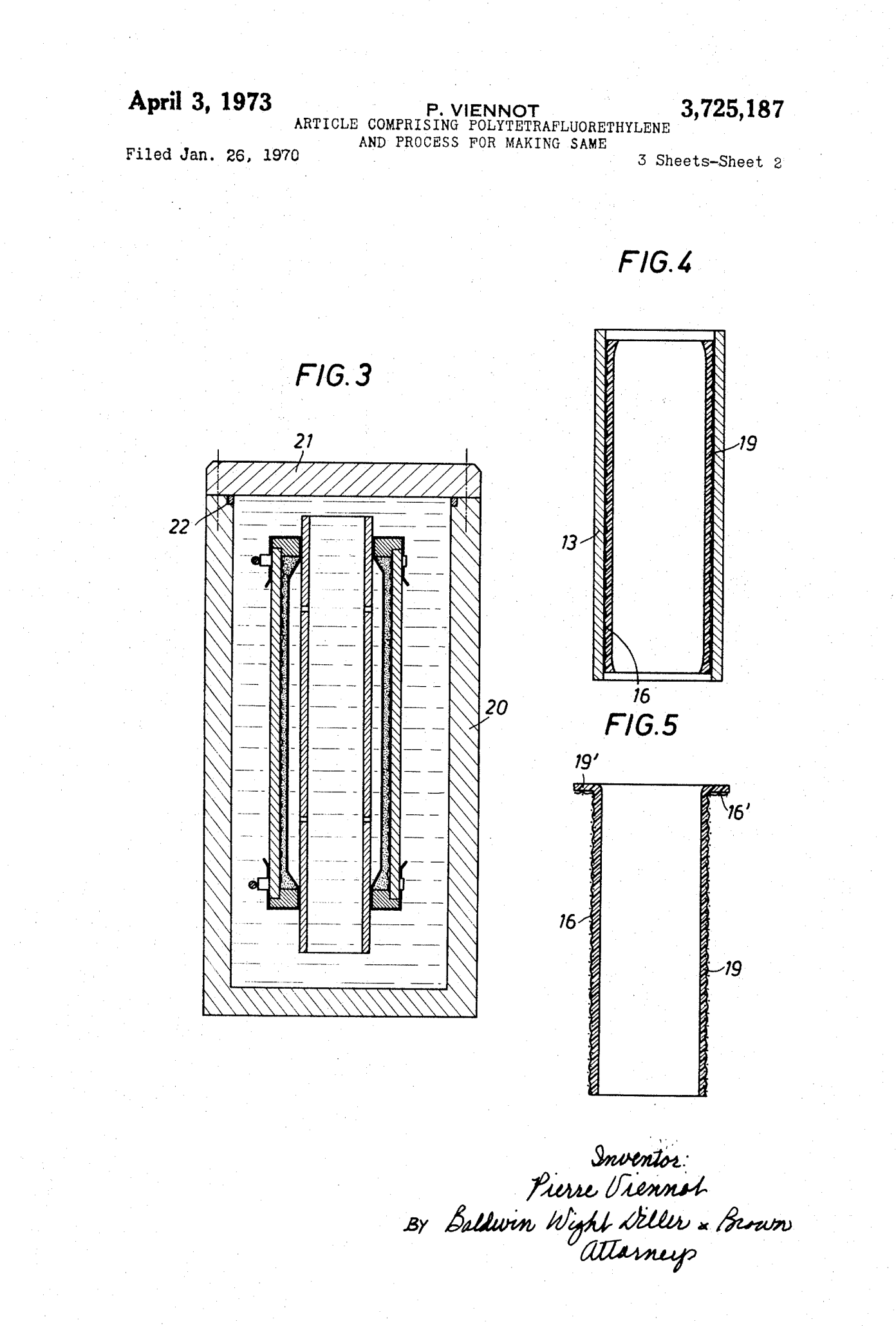

April 3, 1973

P. VIENNOT 3,725,187

ARTICLE COMPRISING POLYTETRAFLUORETHYLENE
AND PROCESS FOR MAKING SAME

Filed Jan. 26, 1970

Inventor:
Pierre Viennot
By Baldwin Wight Diller & Brown
Attorneys

United States Patent Office 3,725,187
Patented Apr. 3, 1973

3,725,187
ARTICLE COMPRISING POLYTETRAFLUORO-
ETHYLENE AND PROCESS FOR MAKING
SAME
Pierre Viennot, Clamart, France, assignor to Societe
Anonyme: Produits Chimiques Ugine Kuhlmann, Paris,
France
Filed Jan. 26, 1970, Ser. No. 5,485
Claims priority, application France, Jan. 31, 1969,
6902207; Jan. 16, 1970, 7001637
Int. Cl. B32b *15/08, 15/02, 31/20*
U.S. Cl. 161—111
12 Claims

ABSTRACT OF THE DISCLOSURE

An article according to the invention has a layer or coating of pure PTFE of a certain thickness on one surface thereof, and on the other surface thereof, a thin layer of PTFE at least partially encasing the metal reinforcement. Such an article is perfectly suited to all the uses to which PTFE is normally put, and particularly the manufacture of apparatus and installations resistant to aggressive chemical products. Thus, a pipe of the aforesaid construction has a corrosion-resistant inner surface. Furthermore, the inner layer of PTFE passes through and partially encases the metal reinforcement which, on that account, is anchored in the material comprising PTFE. The article so obtained possesses mechanical resistance and dimensional stability which are very much greater than those of a similar article made of pure PTFE, the combination of a metal reinforcement and PTFE providing the article with mechanical properties similar to those possessed by the metal reinforcement alone.

---

The invention relates to new articles comprising polytetrafluoroethylene and the process for obtaining them.

It is known that special practical problems arise in the manufacture of polytetrafluoroethylene (hereinafter referred to as PTFE) articles owing, essentially, to the poor mechanical characteristics of such a material. It is furthermore known that PTFE has a very high coefficient of thermal dilatation, which approximates $1 \times 10^{-4}$. The possibilities of using articles, such as pipes, made of pure PTFE are, therefore, very limited.

It is also known that certain parts, particularly metal parts, such as pipes, tanks and the like, must frequently be protected from corrosion by applying a plastic coating thereto. PTFE is perfectly insensitive to the most aggressive chemicals and is, therefore, especially suited to embodiments of this sort. Owing to the poor mechanical properties of PTFE alone the prior technique therefore used processes for coating articles with PTFE. For instance, piping, vessels or other accessories used in installations have been coated with tubes obtained by the method known as the extrusion process. The method known as the isostatic moulding process has already been used to manufacture such pipes. The specialized literature has dealt with both these processes fairly fully, so it is unnecessary to explain them again.

The lack of contact between the PTFE coating and piping is the major drawback of such piping. This drawback being due to the considerable difference in the coefficients of expansion of the materials used, viz PTFE and metals generally used in such installations.

An effort has been made to overcome this drawback to a certain extent by setting up prestresses in the PTFE pipe itself, either by cold or hot treatment, which are relieved when the temperature rises, and only in this case, this causing the PTFE pipe to be relatively pressed onto the metal piping, and thus avoiding folds or blistering. However, this process is not completely satisfactory, and necessitates precautions being taken when PTFE coated articles are being manufactured which entail extra expense.

This invention enables these drawbacks to be avoided, and provides articles consisting of a composite material comprising PTFE which, while providing properties advantageously identical to those possessed by pure PTFE in as far as resistance to corrosion is concerned, have, incomparably higher properties of mechanical strength and dimensional stability than pure PTFE.

An essential object of this invention is to provide an article comprising polytetrafluoroethylene (PTFE) characterized by a discontinuous metal reinforcement with spaces free of material, the said reinforcement having one of its surfaces covered with a continuous coating of PTFE, thus forming the inner surface of said article, whereas the said coating penetrates the said empty spaces by at least partially enclosing the outer surface of the reinforcement, thus forming the outer surface of said article.

An article according to the invention has, therefore a layer or coating of pure PTFE of a certain thickness on one surface thereof, and on the other surface thereof, a thin layer of PTFE at least partially encasing the metal reinforcement. Such an article is perfectly suited to all the uses to which PTFE is normally put, and particularly the manufactuer of apparatus and installations resistant to aggressive chemical products. Thus, a pipe of the aforesaid construction has a corrosion-resistant inner surface. Furthermore, the inner layer of PTFE passes through and partially encases the metal reinforcement which thereby, is anchored in the material comprising PTFE. The article so obtained possesses mechanical resistance and dimensional stability which are very much greater than those of a similar article made of pure PTFE, the combination of a metal reinforcement and PTFE providing the article with mechanical properties similar to those possessed by the metal reinforcement alone.

The article of the invention is clearly the result of a combination of means, owing to the simultaneous use of PTFE and the metal reinforcement. If such means are simply juxtaposed, if, for instance, the inner surface of a metal pipe is merely lined with PTFE, all the previously mentioned drawbacks of the prior technique are met with, i.e. the lack of contact between the PTFE and the metal pipe. Owing to the interpenetration of PTFE and the metal reinforcement in the combination described in the invention, on the other hand, a composite article is obtained which is resistant both to chemical agents and to mechanical or thermal stresses.

To obtain an article according to the invention, discontinuous metal reinforcements are used, preferably made of alloy steel, such as mild steel or stainless steel for instance. Expanded metal plates or grids can be advantageously used for this purpose. The spaces containing no material, or the spaces between the grid mesh, are of areas in the range of 3 to 8 mm.$^2$, for instance, to enable both correct penetration of the molten PTFE, and for the solidified PTFE to be held within the reinforcement. If metal sheets are used, they should be selected with perforations having a slightly conical profile inwardly from the outside (undercut sheets).

In as far as the PTFE is concerned, conventional PTFE moulding powders are used preferentially, but extruding powders or any other similar material comprising PTFE can also be used.

The articles according to the invention preferably possess an axis of rotation. There follows a description of a complete example of the manufacture of a pipe, with reference to the appended drawings. Generally speaking, the known technique called the isostatic moulding process, adapted to the special requirements of the invention, is used, taking into account the joint use of a metal reinforcement and PTFE.

The process for obtaining articles according to the invention therefore uses the isostatic moulding process, and comprises the placing of a discontinuous metal reinforcement adjacent to the mould wall.

In this technique, it is preferable to use a mould immersed in a tank to equilibrate pressures. A rubber membrane placed in the mould enables the powdered PTFE to be applied to the sides of the mould at high pressures, such as 250 bars. The composite moulded article is then cured, at 380° C. for instance, as is usual in the case of articles comprising PTFE.

Trails on the behaviour under thermal stress of the articles obtained were carried out by first heating the article to 400° C., then plunging it into liquid nitrogen (−170° C.). No loosening of the metal reinforcement and PTFE was observed, in spite of the different thermal dilatation coefficients of the metal and PTFE, the said coefficients having a ratio of 1 to 10.

According to another advantageous characteristic of the invention composite, tubular articles, for instance, can be worked by mechanical methods, notably to produce collars or flanges. The end of a tubular article can thus be mechanically bent back into a flange, thus providing an article which may be fixed to other elements by the said flange. It should be noted that after an end flange is formed, the metal reinforcement may become completely detached from the PTFE on the side surface of the flange, while remaining at least partially coated along the remainder of the pipe. In practice this is not a drawback as, when such flanges are secured to other elements, the fixing members such as bolts or the like pass through the flange, traversing both the PTFE and the reinforcement, thus continuing to securely fix the reinforcement of the assembly so formed.

A particular advantage provided by the invention should be noted, the fact that it enables articles made of PTFE to be assembled in a secure and permanent manner, which has not hitherto been possible in a satisfactory manner using the methods of the prior art.

Another aspect of the invention relates to a coating method in which the reinforced article comprising PTFE as defined hereinabove is used by associating it during or after moulding and after curing, with a metal tinsmith's or boiler maker's article, or any other part requiring protection. Still another aspect is that the composite article according to the invention can be reinforced on the outside by a non-metal material which could, for instance, be securely fixed to the outer surface of the article by means of an adhesive.

The invention will now be illustrated by the following description, referring to the appended drawing in which:

FIGS. 1 to 3 show diagrammatically, the various steps of a process to obtain a composite tubular article comprising PTFE according to the invention.

FIG. 4 shows an axial cross section of the article obtained before it is removed from the mould.

FIG. 5 shows an article derived from the article of FIG. 4.

Figure 1:
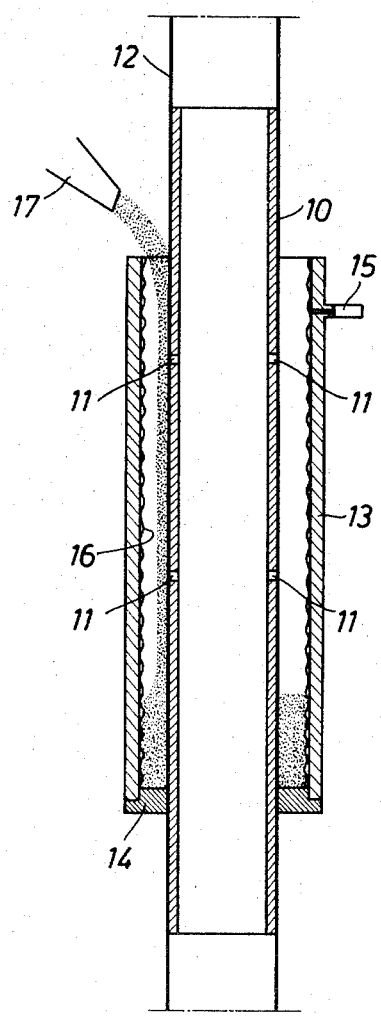
Figure 2:
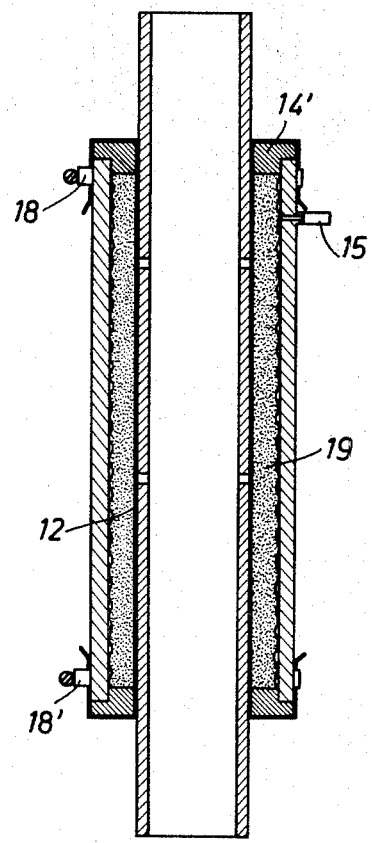

As is seen in FIGS. 1 and 2, the moulding device comprises an inner madrel 10 having a number of apertures 11. A cylindrical rubber membrane 12 surrounds the periphery of mandrel 10. The mould properly speaking consists of a die 13 having a push-rod or closure device 14 at the lower portion thereof. This device acts both as a closure member and to center mandrel 10 in die 13. Mould 13 also includes a pipe 15 enabling the interior of the mould to be connected to a vacuum source, not shown.

FIG. 1 shows the positioning of materials for forming the composite article. For this purpose, a cylindrical metal reinforcement in the form of a member 16 of expanded stainless steel is used. The empty space existing between the rubber membrane 12 and the die wall adjacent to which the reinforcement 16 is positioned, is filled with powdered PTFE from, for instance, a spout 17. The PTFE powder can be introduced by gravity. Mechanical vibration of the assembly by any known means, such as a vibrator placed on the wall of mould 13, can improve the distribution of the PTFE powder if necessary.

Once filling has been effected, both ends of membrane 12 are folded back over the walls of the mould 13, as is shown in FIG. 2, the upper portion of the mould having previously been provided with another push-rod 14', identical to push-rod 14. The turned-back portions of membrane 12 are held by two collars 18 and 18' respectively, thus ensuring sealing. At this stage of the operation, the air contained within the mass of powder 19 is voided by connecting pipe 15 to the vacuum pump, connection with the vacuum is then stopped.

The assembly formed by mould 13 and its inner mandrel 10 is then introduced into a tank, full of water, able to support the pressure of isostatic moulding. This operation is represented in FIG. 3, the tank being hermetically closed by a lid 21 with a sealing joint 22 positioned between the tank and the lid. A high pressure is then established within tank 20 by a pumping device, not shown, as is usually the case in such a moulding technique. The hydrostatic pressure can be raised to 250 bars, for example. The pressure is transmitted and applied to the PTFE powder mass 19 by means of membrane 12. The PTFE powder is compacted by the effect of the pressure, and penetrates into the interstices of reinforcement 16 by being applied against the wall of mould 13. Moulding properly speaking is then ended.

After slow slackening off of the pressure, and opening of tank 20 by the removal of lid 21, the assembly is removed from the tank. Membrane 12 and the inner mandrel 10 are then separated from the mould assembly by removing collars 18, 18' and push-rods 14, 14'. Mould 13 containing the desired composite article is then taken to the furnace for curing, as is usual with PTFE, at a temperature of about 380° C. for instance. After curing, a composite article is obtained which can be removed from mould 13, as shown in FIG. 4.

FIG. 5 shows a tubular article of the type obtained after the article shown in FIG. 4 is removed from the mould and has undergone a mechanical operation at one end to form a flange. As is seen in FIG. 5, the pipe according to the invention is made of a composite material comprising PTFE (reference 19) containing a discontinuous metal reinforcement 16. The bent-back end has a flange 19' of pure PTFE against which there is applied the end 16' of the metal reinforcement 16. The pipe shown in FIG. 5 can be used as it is in installations which have to resist corrosive chemical agents, and can also be assembled with any other element having a fixing flange of similar size.

Figure 6:
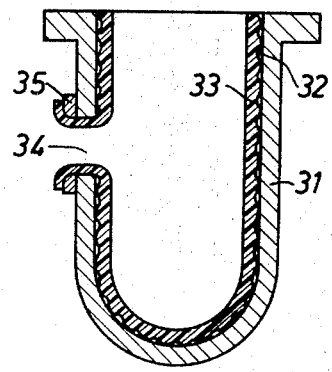
FIG. 6 shows the application of the invention to coat the inner surface of a vessel, the said vessel being shown in cross-section.
Figure 7:
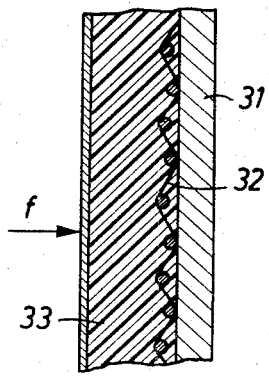
FIG. 7 is a large scale view of a portion of the vessel of FIG. 6 showing the structure of the coating.

FIGS. 6 and 7 show a vessel provided with an inner lining according to the invention.

To coat vessel 31, a discontinuous material 32 such as a metal grid to form a reinforcement, is placed within the vessel and is covered immediately with a layer of PTFE powder on which isomoulding pressure is exerted in the direction shown by arrow $f$ (FIG. 7).

As shown in FIG. 6, the reinforcement comprises an opening 34 on the level of a side aperture 35 in which the coating 33 is hot pressed in the shape of the finger of a glove, then bent back over the opening 34.

The ends of the coating can consist of pure PTFE without a metal reinforcement, to facilitate eventual bending back of a flange to enable mechanical connection to a strap. If the reinforcement 32 is sufficiently malleable, it may be retained up to the ends and bent back with the flange.

The final curing can be carried out in the coating apparatus, or not, and this under conventional PTFE curing conditions.

The invention is not limited to the modes of embodiment, which have been described with reference to the appended drawings, as the new composite, reinforced material comprising PTFE can be used by those skilled in the art in very diverse ways without departing from the scope of the invention.

The invention provides the following advantages among others:

(1) The invention makes it possible to use a reinforced, composite article comprising PTFE in its intrinsic form for all applications for which this solution is suited.

(2) The invention enables parts to be obtained having geometrically perfectly defined sides, stable in time, and practically proof against even large variations in temperature, owing to the presence of the metal reinforcement on one surface of the article. Longitudinal and radial dilatation of the PIFE is thus palliated, any dilatation occurring mainly in the direction of compression.

(3) Articles according to the invention can be used in vacuum circuits, even at high vacuums.

(4) The invention enables the steps of pre-stressing, which were necessary in certain processes of the prior art to obtain articles comprising PTFE, to be done away with.

(5) The invention makes it possible to provide places on the finished part where there is no metal reinforcement, so that it is possible to form apertures (glove fingers), openings or turned back flanges.

(6) The invention makes it possible to carry out direct moulding of the protective coating comprising PTFE onto a given part, a metal-to-metal contact thus being possible between the part and the metal reinforcement to provide heat-exchange if required.

(7) The invention makes it possible to strengthen or protect the composite article after curing, by the conventional metal covering, by coating with a non metal material applied by an adhesive, by projection of any other technique which is applicable in this case.

I claim:

1. A pressure-molded article comprising a discontinuous metal reinforcement with spaces therein free from the metal material thereof; and PTFE material pressure-molded throughout in contact with said metal reinforcement and providing a continuous coating on one surface of said metal reinforcement, extending into said spaces and filling the latter, and extending beyond said spaces and at least partially encasing the opposite surface of said metal reinforcement.

2. The article of claim 1 wherein the discontinuous metal reinforcement is of alloy steel.

3. The article of claim 1 wherein the discontinuous metal reinforcement is of steel selected from mild steel and stainless steel.

4. The article of claim 1 wherein the discontinuous metal reinforcement consists of an expanded metal.

5. The article of claim 1 wherein the discontinuous metal reinforcement consists of metal grid.

6. The article of claim 1 wherein said spaces free of metal material in the discontinuous metal reinforcement have an area in the range of 3 to 8 mm.$^2$.

7. The article of claim 1 wherein the discontinuous metal reinforcement is an undercut perforated metal sheet, the perforations in the said sheet having a slightly conical profile inwardly from the outside.

8. The article of claim 1 having the shape of a body of revolution.

9. The article of claim 1 having a tubular form.

10. The article of claim 1 having a tubular form with at least one end flange.

11. The article of claim 1 wherein the outer surface of said article is reinforced by a metal covering.

12. The article of claim 1 wherein the outer surface of said article is reinforced with a non metal additional coating of structural reinforcing material.

References Cited

UNITED STATES PATENTS

| | | | |
|---|---|---|---|
| 2,972,549 | 2/1961 | Goldsmith | 161—189 X |
| 2,731,068 | 1/1956 | Richards | 156—324 |
| 2,728,698 | 12/1955 | Rudner | 161—189 X |
| 2,688,581 | 9/1954 | Stubbs | 156—231 |
| 2,962,057 | 11/1960 | Webber | 161—213 |
| 2,989,433 | 6/1961 | Yuan | 161—189 X |
| 3,486,961 | 12/1969 | Adams | 161—189 X |
| 3,582,108 | 6/1971 | Carlton | 161—111 X |
| 3,616,188 | 10/1971 | Mancel | 161—189 |
| 3,617,364 | 11/1971 | Jarema | 161—189 X |

HAROLD ANSHER, Primary Examiner

U.S. Cl. X.R.

161—189, 213